Dec. 20, 1960
B. S. TAYLOR
2,965,532
METHOD FOR MANUFACTURING RESIN COATED
GLASS-REINFORCED PLASTICS AND PRODUCT
Filed May 20, 1955
*Fig. 1* - Assembly of Components
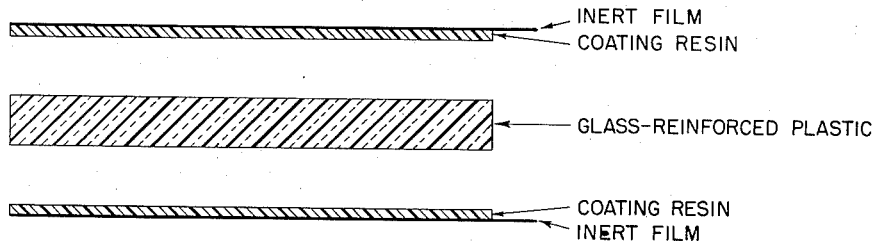
*Fig. 2* - Bonding Resins During Curing
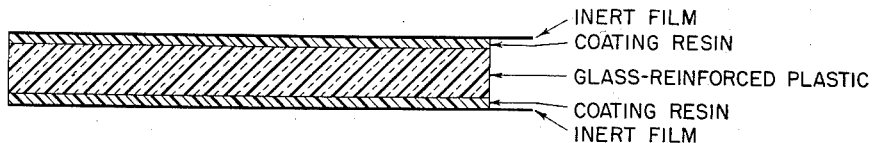
*Fig. 3* - Stripping of Inert Film
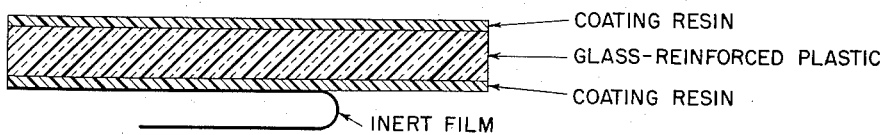
Bert S. Taylor
INVENTOR.
BY
Glenn W. Parsons
AGENT.

# 2,965,532
METHOD FOR MANUFACTURING RESIN COATED GLASS-REINFORCED PLASTICS AND PRODUCT

Bert S. Taylor, St. Albans, W. Va., assignor to Food Machinery and Chemical Corporation, New York, N.Y., a corporation of Delaware Filed May 20, 1955, Ser. No. 510,040

6 Claims. (Cl. 154—120)

This invention relates to glass-reinforced plastic compositions and also to a method of protecting and preserving glass-reinforced plastic compositions by a novel process.

In the manufacture of glass-reinforced flat or corrugated sheeting, made from glass fibers and, ordinarily, polyesters, the final product after cure contains a fair proportion of the glass fibers either very close to, or on, the surface. Shrinkage takes place during the curing of polyester resin, and such shrinkage causes a pulling away of resin binder from fiber, with the result that surface fibers may be coated with only a fraction of a thousandth of an inch of protective resin.

The original glass-reinforced sheeting is translucent and is suitable for such uses as exterior walls of houses, or similar applications in greenhouses and industrial buildings. However, erosion of the cured polyester from the glass fiber nearest the surface results in rapid failure by weathering of these glass-reinforced sheets. Since polyester resin itself is not entirely weatherproof, thin coatings are quickly attached and decomposed by moisture, exposing the unprotected glass to the elements, and thereby causing a decrease in light transmission. Once the fiber ends are exposed on the sheet surface, moisture penetration into the body of the sheet takes place, with consequent deterioration of the entire structure.

Various attempts to remedy these difficulties have heretofore been made, such as using more polyester resin in the glass mat, or curing and impregnating the sheets in two stages. These methods have proven ineffective and impractical and, before the present invention, the problem of preventing weathering of glass-reinforced polyester sheeting remained unsolved.

Accordingly, an object of this invention is to provide a method for stabilizing glass-reinforced polyester sheet against erosion and weathering.

Another object is to provide a method for coating glass-reinforced polyester sheet with a permanently bonded resinous film.

Another object is to provide a method for stabilizing glass-reinforced polyester sheet by coating said sheet with a moisture-resistant resinous coating.

A further object is to provide a method for stabilizing glass-reinforced polyester sheet by coating said sheet with a light-resistant resinous coating.

These and other objects and advantages will become apparent from the subsequent description of the invention.

Disclosed and described herein is a method for permanently coating glass-reinforced polyester sheet with a thin, uniform layer of a resin stable to the action of moisture, heat, light and other weathering conditions.

The usual process for the manufacture of glass-reinforced plastic sheeting is to impregnate a glass fiber "mat" with an uncured or incompletely cured resin, which resin is usually of the polyester type. After the impregnation with resin, a film such as cellophane is generally applied to each side of the mat. The product is cured under mild pressure, and the cellophane film is stripped off.

It has been discovered that, by applying to the cellophane film a coating of a resinous material of different composition but partially compatible with the polyester used, and then applying the coated cellophane to each side of the glass-polyester sheet, the coating may be transferred from the cellophane to the glass-polyester sheet during cure, thereby forming a firmly bound protective layer of uniform thickness on the glass-polyester sheet.

In applying such a coating, it is necessary to avoid extensive mixing of the coating with the polyester used to impregnate the glass mat. Should such mixing occur, the glass fibers could still lie close to the surface, and the protective effect of the surface film would be diminished.

On the other hand, the coating material must be compatible to some extent with the polyester, in order to form a tight bond between the two resins. The composition of the coating resin may thus vary with the composition of the glass-reinforcing resin.

Or, the physical properties of the coating resin may be so adjusted that the two types of resins are partially compatible during curing. This may be accomplished by partially curing the layer of resin on the cellophane film, so that its viscosity will be different from that of the glass-reinforcing resin.

For a more complete understanding of the nature of the present invention, reference is made to the accompanying drawing, in which:

Figure 1 represents diagrammatically the glass-reinforced plastic composition positioned between layers of coating resin supported on an inert film;

Figure 2 represents the curing step, wherein the coating resin and the glass-reinforced plastic are bonded at their interface during curing; and Figure 3 represents the stripping of the inert film from the cured product.

A preferred coating composition is a partially polymerized resin such as diallyl phthalate prepolymer, or diallyl phthalate prepolymer modified with a polyester, since such compositions have excellent resistance to wear and to the action of water and light, and low shrinkage during cure. A suggested base material for these film compositions would consist of glass mat, as ordinarily produced from either continuous or chopped glass fibers, impregnated with a polyester of the type made from glycols and dibasic acids including maleic, the resin being activated with a peroxide catalyst.

As an illustration of the present invention, solutions having the composition below were coated on cellophane at about 5 mils thickness, so that the dried coatings were about 2½ mils thick. Parts are by weight:

| | Parts |
|---|---|
| Diallyl phthalate prepolymer | 90 |
| Diallyl phthalate monomer | 10 |
| Tert.-butyl perbenzoate | 1 |
| Methyl ethyl ketone | 50 |
| Toluene | 50 |

These cellophane coated films were dried as shown in Table 1, and applied to a lay-up of six layers of resin-impregnated glass cloth having a glass to polyester ratio of 30 parts glass to 70 parts resin. These coated compositions were cured at 132° C. for 35 minutes, at the pressures shown in Table 1. The films were pigmented to facilitate observation of the appearance of the coating.

Table 1.—*Polydiallyl phthalate coated glass laminates*

| Film drying time, min. | | Laminating pressure, p.s.i. | Appearance of coating |
|---|---|---|---|
| 100° C. | 177° C. | | |
| 10 | ------ | 28 | Flowed into laminate, broken film surface. |
| 15 | 20 | 28 | Uniform, unbroken film, very little flow. |
| 15 | 40 | 360 | Uniform, unbroken film, no flow. |

The results of Table 1 show the need for adjusting the viscosity of the surface resin, in this case by adjusting the film drying time, to avoid excess flow of the surface resin into the laminate during the curing cycle. Thus, uniform, firmly bound films may be formed.

The principle of this invention need not be confined to flat or corrugated glass sheeting, but may also be utilized in such processes as the following: production of polyester-glass reinforced pipe, where an especially resistant lining or outer coating may be required; lining of tanks or tank trucks where the polyester or other resin lining may not be sufficiently resistant to chemicals or food products; manufacture of odd-shaped articles such as chair bodies where the process may be used for both protective and decorative purposes.

It is contemplated that the present invention need not be limited to the production of protective coatings, but may also be used to produce decorative and colored coatings. A major problem in the resin industry is that of making uniformly colored glass-reinforced plastic panels. By applying a uniform gage film of a coating resin, according to the invention disclosed herein, said resin film containing a standard amount of dye or pigment, uniform color shades are readily achieved, even on panels which may be of varying thickness or which may contain varying amounts of resin.

The resinous coating may also be printed with a decorative pattern, so that this design transfers to and becomes a part of the sheet surface. Thus, the glass-reinforced plastic articles may be coated with a decorative coating, either of one solid color, or with a single- or multi-color pattern, to produce pleasing effects not obtainable by other means, and protected from weathering action by the resinous coating.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced otherwise than as specifically described and exemplified herein, by those skilled in the art, and having the benefit of this disclosure.

That which is claimed as patentably novel is:

1. In a process of protecting and stabilizing a glass-reinforced polyester composition, the steps of curing to an intermediate degree of polymerization on a supporting film a uniform layer of a polydiallyl phthalate coating resin capable of being cured in successive stages, applying said coating resin to at least one surface of a glass-reinforced polyester composition selected from the group consisting of uncured and incompletely cured dibasic acid-glycol polyester resin compositions which are capable of being further cured, and completing the curing of said coating resin and said polyester composition simultaneously, whereby the coating resin is adherently chemically bonded to the glass-reinforced polyester composition.

2. In a process of applying a protective and stabilizing coating composition to a glass-reinforced polyester composition, the step which comprises applying to a surface of a glass-reinforced polyester composition selected from the group consisting of uncured and incompletely cured dibasic acid-glycol polyester resin compositions which are capable of being further cured a uniform layer of a resinous prepolymer comprising partially polymerized diallyl phthalate supported on a cellophane film and characterized by partial compatibility with the polyester composition, followed by a curing step which comprises simultaneously curing and chemically bonding the prepolymer and the polyester composition.

3. The method of protecting and stabilizing a glass-reinforced polyester composition against decomposition due to weathering by applying a moisture resistant and light resistant coating of a diallyl phthalate resin thereto, which comprises: applying to a cellophane film a coating of a partially cured polymer of a diallyl phthalate; effecting contact between said coating and a surface of a glass-reinforced polyester composition selected from the group consisting of uncured and incompletely cured dibasic acid-glycol polyester resin compositions which are capable of being further cured; chemically bonding the contacted surfaces by curing; and stripping the cellophane film from the cured resin-coated polyester composition.

4. The method of claim 3, wherein the resinous coating comprises a coloring agent.

5. A glass-reinforced plastic composition characterized by resistance to degeneration and discoloration, comprising as a base material a body of polyester resin having distributed therein a plurality of glass fibers, said polyester being the polycondensation product of an unsaturated dibasic acid and a glycol, and as a coating material an adherent layer of polymerized diallyl phthalate.

6. A glass-reinforced plastic composition characterized by resistance to degeneration and discoloration, comprising as a base material a body of polyester resin having distributed therein a plurality of glass fibers, said polyester being the polycondensation product of maleic acid and a glycol, and as a coating material an adherent layer of polymerized diallyl phthalate, said polymerized diallyl phthalate being chemically bonded to said polyester resin.

References Cited in the file of this patent

UNITED STATES PATENTS

| | | |
|---|---|---|
| 1,984,649 | McDonald et al. | Dec. 18, 1934 |
| 2,116,205 | Kaufmann | May 3, 1938 |
| 2,273,891 | Pollack et al. | Feb. 24, 1942 |
| 2,300,503 | Hamister et al. | Nov. 3, 1942 |
| 2,339,058 | D'Alello | Jan. 14, 1944 |
| 2,399,214 | Evans et al. | Apr. 30, 1946 |
| 2,404,073 | Karfiol et al. | July 16, 1946 |
| 2,446,119 | White et al. | July 27, 1948 |
| 2,493,364 | Schoene | Jan. 3, 1950 |
| 2,510,750 | Marquardt | June 6, 1950 |
| 2,532,941 | Rado | Dec. 5, 1950 |
| 2,545,832 | Wagers et al. | Mar. 20, 1951 |
| 2,593,553 | Francis | Apr. 22, 1952 |
| 2,631,958 | Francis | Mar. 17, 1953 |
| 2,662,044 | Morrison et al. | Dec. 8, 1953 |
| 2,733,180 | Pinto | Jan. 31, 1956 |
| 2,817,619 | Bickel et al. | Dec. 24, 1957 |

FOREIGN PATENTS

| | | |
|---|---|---|
| 562,573 | Great Britain | July 6, 1944 |
| 627,874 | Great Britain | Aug. 17, 1949 |

UNITED STATES PATENT OFFICE
CERTIFICATION OF CORRECTION

Patent No. 2,965,532            December 20, 1960

Bert S. Taylor

It is hereby certified that error appears in the above numbered patent requiring correction and that the said Letters Patent should read as corrected below.

Column 1, line 32, for "attached" read -- attacked --.

Signed and sealed this 23rd day of May 1961.

(SEAL)
Attest:

ERNEST W. SWIDER
Attesting Officer

DAVID L. LADD
Commissioner of Patents